United States Patent [19]

Ammeraal

[11] Patent Number: 5,007,967

[45] Date of Patent: Apr. 16, 1991

[54] SEPARATION AND PURIFICATION OF BRANCHED BETA CYCLODEXTRINS

[75] Inventor: Robert N. Ammeraal, Worth, Ill.

[73] Assignee: American Maize-Products Company, Hammond, Ind.

[21] Appl. No.: 232,307

[22] Filed: Aug. 15, 1988

[51] Int. Cl.$^5$ .......................... C13D 3/14; B01D 15/08
[52] U.S. Cl. .................................... 127/46.1; 127/38; 127/40; 127/46.2; 127/55; 210/679; 210/691; 210/692; 536/103; 514/58
[58] Field of Search ................. 127/38, 40, 46.1, 46.2, 127/46.3, 55; 210/679, 691, 692; 536/103; 514/58

[56] References Cited

U.S. PATENT DOCUMENTS

| | | | |
|---|---|---|---|
| 4,668,626 | 5/1987 | Kobayashi et al. | 435/95 |
| 4,781,977 | 11/1988 | Yagi et al. | 428/332 |
| 4,808,232 | 2/1989 | Beesley | 127/46.3 |

*Primary Examiner*—Chung K. Pak
*Attorney, Agent, or Firm*—Lucas & Just

[57] ABSTRACT

Branched beta cyclodextrins are purified and separated sequentially from solution by passing a solution containing branched beta cyclodextrins through a column containing a matrix on which an inclusion compound has been bound. The process is carried out under ambient conditions at a neutral pH.

5 Claims, 1 Drawing Sheet

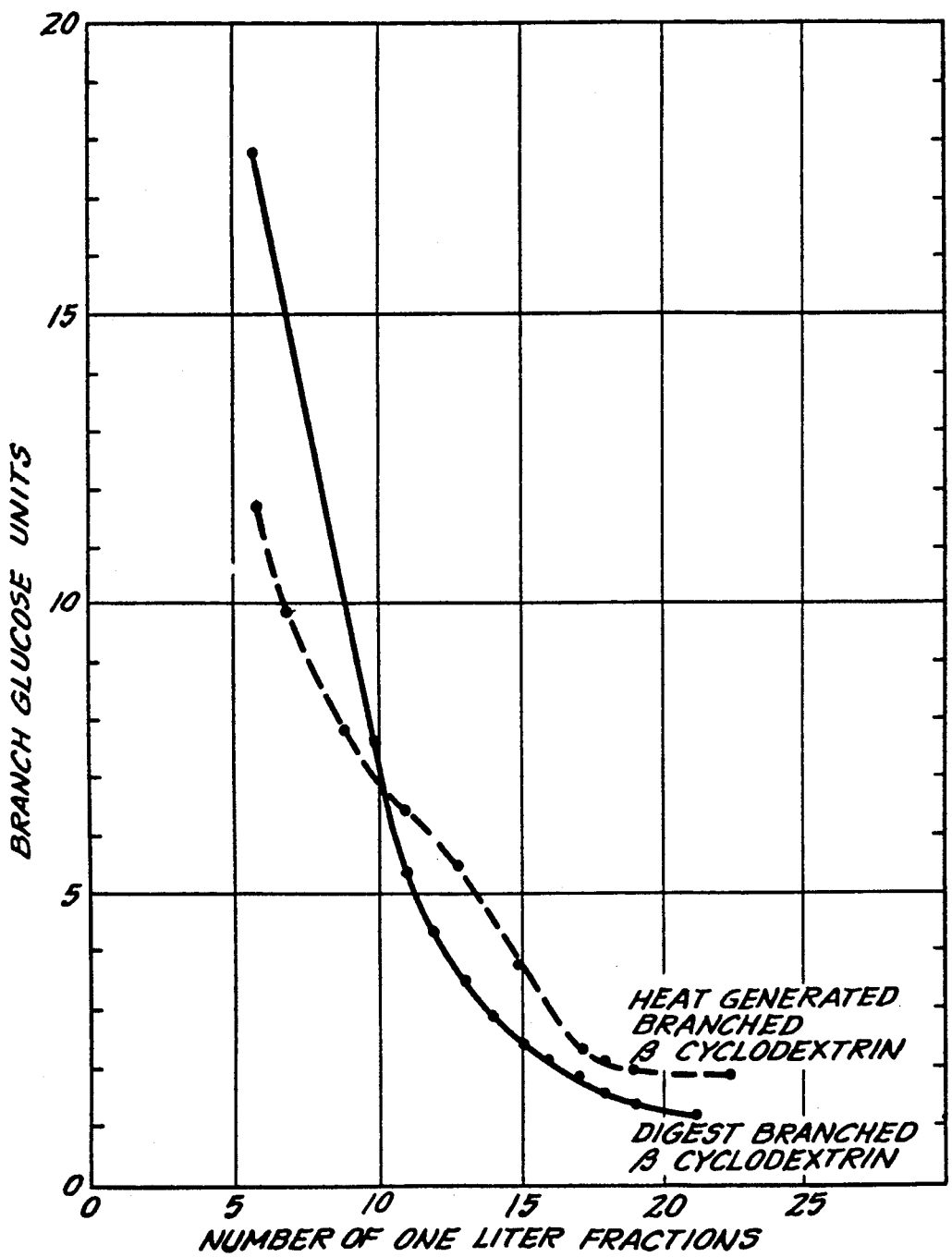
FIG. I.
MOLECULAR WEIGHT PROFILES FOR TWO TYPES OF BRANCHED β CYCLODEXTRIN ON DOWEX 1×2 (BENZOATE FORM) RESIN

SEPARATION AND PURIFICATION OF BRANCHED BETA CYCLODEXTRINS

This invention relates to cyclodextrins and, more specifically, to a chromatographic method of separating and purifying branched beta cyclodextrins. The chromatographic material employed in the present invention is a matrix onto which an inclusion compound has been bound.

Cyclodextrins, also called Schardingers dextrins, cycloamyloses, cyclomaltoses and cycloglucans, are oligosaccharides of anhydroglucose, bonded together by alpha 1,4 bonds to form a ringed compound. A six membered ring is called alpha cyclodextrin; seven, beta cyclodextrin; and eight, gamma cyclodextrin.

A typical source of anhydroglucose for making cyclodextrins is starch.

Starch occurs naturally in a variety of plants such as corn, potato, sorghum and rice and is extracted from portions of the plant by a milling operation which separates the starch from the plant. Physically, the starch is in a granular form which typically comprises both amylose and amylopectin.

Amylose is a straight chained polymer of anhydroglucose units bonded together by alpha 1,4 bonds while amylopectin is a polymer composed of a straight chain of alpha 1,4 anhydroglucose onto which side chains of alpha 1,4 anhydroglucose polymers are bonded. In amylopectin, the bond between the straight chain and the side chain is an alpha 1,6 bond. The amount of amylose and amylopectin in a starch granule depends on the source of the starch. For example, starch obtained from high amylose corn contains about a 50:50 ratio while starch obtained from waxy corn contains about a 99:1 ratio of amylopectin to amylose.

Branched cyclodextrins were described as early as 1965 by French and his co-workers, see French et al., Archives of Biochem. and Biophys. Volume III, pages 153-160, 1965, but had been studied very little until recently. Branched cyclodextrins, as their name implies, have one or more anhydroglucose units bonded onto the ring structure such that a branch extends out from the ring structure.

Conventionally, cyclodextrins are obtained by treating a starch slurry with enzyme or acid to produce a gelatinized and liquefied slurry having a DE between 1 and 5. The gelatinized and liquefied starch slurry is then treated with cyclodextrin glycosyltransferase (CGT), at the appropriate pH, temperature and time for the selected CGT. The enzyme, CGT, is obtained from microorganisms such as *Bacillus macerans, B. magaterium, B. circulans, B. stearothermophilus,* and Bacillus sp. alkalophilic) as well as others. The resulting digest from the treatment of a gelatinized and liquefied starch slurry with CGT contains acyclic dextrins and cyclic dextrins such as branched cyclodextrins and non-branched cyclodextrins. To produce branched cyclodextrins, it is preferred that a starch high in amylopectin, such as a waxy starch, be used as a starting material.

Two other processes for making branched cyclodextrins include U.S. Pat. No. 4,668,626 issued May 26, 1987, which discloses an enzymatic method for making branched cyclodextrins; and copending U.S. application Ser. No. 232,389 filed concurrently herewith, now U.S. Pat. No. 4,904,307, which discloses the formation of branched cyclodextrins by pyrolysis of cyclodextrins.

A method for separating and purifying branched cyclodextrins is taught in copending U.S. application Ser. No. 071,097 filed July 8, 1987, now U.S. Pat. No. 4,840,679, issued 6-20-89. The '097 application teaches a multi-step liquid separation/purification technique.

Applicant has now discovered that by passing an aqueous solution containing branched beta cyclodextrins through a matrix upon which an inclusion compound has been bound, branched beta cyclodextrins are separated and purified.

Broadly, the present invention comprises the steps of passing an aqueous solution containing branched beta cyclodextrins through a matrix upon which an inclusion compound is bound and eluting the branched beta cyclodextrins thereafter.

BRIEF DESCRIPTION OF THE DRAWING

FIG. 1 illustrates a plot of the number of glucose units in a branch versus the fraction of the eluted solutions in Examples 2 and 3 respectively.

The preferred chromatographic material for use in the present invention is taught in copending U.S. application Ser. No. 938,821 filed Dec. 8, 1986, now U.S. Pat. No. 4,808,232, issued 2-28-89, the teaching of which is incorporated herein by reference.

The '821 application teaches that the chromatographic material comprises a matrix upon which an inclusion compound is bound. The matrix itself should be water insoluble and present a stable particle formation such that it is able to withstand dynamic flow conditions. Additionally, the matrix should have a high purity and have the ability to be sterilized. These purity and sterilization aspects are especially applicable when dealing with cyclodextrins which are to be used for foods, cosmetics, and drugs. The matrix must also be susceptible to modification in that it must be able to have the inclusion compound bound thereto.

Specific examples of the matrices taught by the '821 application include silicas, celluloses, polyacrylamide gels, styrene divinyl benzene beads, polyacrylate beads, polystyrene beads and derivatives thereof having the foregoing characteristics. Commercial brands of these matrices include DOWEX 1 and INDION A3. In the present invention, good results have been obtained with DOWEX 1×2 having a mesh size between about 100 and 400.

The '821 application teaches that inclusion compounds are compounds which form a host-guest relationship between an aqueous solution of the branched beta cyclodextrins and the inclusion compound. It is known that different compounds have differing affinities for cyclodextrins as a guest within the host cyclodextrins. The affinity between the inclusion compound and any cyclodextrin must not be so great as to prevent the cyclodextrins from being eluted from the matrix. In the present invention the inclusion compound is preferably benzoate, beta-naphthol or phenolphthalein. Good results in the instant invention have been obtained with a benzoate radical obtained from sodium benzoate.

The '821 application teaches that the inclusion compound is preferably positioned a distance from the actual surface of the matrix and that the preferred distance is about equal to about four (4) to twelve (12) single bonded carbon atoms bonded in a chain typical of saturated aliphatic carbon compounds. This distance allows the inclusion compound to function without being interfered with by the matrix. In terms of metric units, this distance is about six (6) to eighteen (18) Å with best results obtained at about nine (9) Å. Larger distances can be used with no apparent advantage and without the disadvantage of the chain bending back on itself.

The compound used to space the inclusion compound from the matrix is referred to as a bridging compound. The '821 application teaches that the bridging compound can be any organic compound which is able to bond both to the matrix and to the inclusion compound. Generally, such bridging compounds are bifunctional aliphatic, or aromatic compounds. Such bridging compounds include glycidoxipropyltrimethoxysilane, glycidoxipropyldimethylchlorosilane, glycidoxipropyltriethoxysilane, butyldiethylaminoethyl, butyltriethylamine and 3-phenylpropyldimethylchlorosilane. In the present invention, aliphatic and aromatic compounds that are bifunctional and form a covalent bond with both the matrix and the inclusion compound are preferred.

The chemistry of forming the matrix with the inclusion compound bonded thereto is well-known and will vary depending on the chosen matrix, bridging compound, and inclusion compound.

In order to pass the branched beta cyclodextrin-containing solution through the matrix, it is preferred to place the matrix into a container that immobilizes the matrix and allows the cyclodextrin-containing solution to pass through the matrix. Preferably, a column is used. Other suitable processes include fixed bed, moving bed, or simulated moving bed processes. Good results have been obtained using columns measuring 70 to 90 cm in length and having 3 to 1 inch internal diameters, respectively. A deeper bed is preferred for individual component separations the solution containing branched beta cyclodextrins is heated prior to passing it through the matrix. The solution is maintained in a heated state while passing it through the matrix.

The digest obtained after treating starch with CGT contains not only branched beta cyclodextrins but also other cyclodextrins, unreacted starch granules, dextrins, reducing sugars, and the like.

It is preferred that when the branched beta cyclodextrin solution contains unreacted starch granules and insoluble dextrins these particles be filtered off. Preferably, the sample should be carbon bleached and ion exchanged, according to common practice, to prevent color adsorption on the column and loss of inclusion compound.

It is preferred that the solution containing branched beta cyclodextrins has had the non-branched beta cyclodextrins removed prior to passing it through the matrix. Generally, non-branched beta cyclodextrins are removed by precipitation. The precipitation of non-branched beta cyclodextrins from a solution is well described in the literature.

The process of the present invention is carried out under ambient pressure and temperature with the pH of the solution preferably being in a neutral range. The pH should not go below 3.

The solids and amount of the charge may vary. Solids are preferably between about 5 to 40% by weight. Good results have been obtained with solids in the range of 20 to about 40%.

Good results have been obtained using deionized water as the eluant. A mixture of alcohol and water can be used to speed the elution.

These and other aspects of the present invention may be more fully understood by reference to the following examples.

EXAMPLE 1

Branched beta cyclodextrins were isolated by solvent precipitation and washing with equal amounts of water to remove acyclic material from the precipitate. This charge was applied in a solution having a solids content of 35% to a 2.5 cm ×90 cm chromatographic column containing DOWEX 1, strong base, 2% cross linked, 200–400 mesh ion exchange resin in the benzoate form. The eluant was deionized water, delivered from a hydrostatic head of about 4 feet, and the flow through the column was 3 to 4 ml/min. The first fraction collected had about 450 ml and subsequent fractions were about 350 ml each. These were concentrated on a steam table and dried at 110° C. in an oven. Each sample was then analyzed by high pressure liquid chromatography (HPLC) on a B-naphthol substituted support. Thin layer chromatography (TLC) was also performed on LK6D plates with n-propanol:water:ethyl acetate:ammonia (6:3:1:1). Three ascents or continuous overnight TLC were used to develop the plate; the usual application was 10 microliters of a 1% solution. Spots were visualized with methanolic $H_2SO_4$.

The first fraction (450 ml) contained nearly all the acyclic saccharides. The subsequent fractions contained branched beta cyclodextrins of decreasing (with increasing elution volume) molecular size. Non-branched beta cyclodextrins were eluted last after 3 to 4 liters elution volume.

Corresponding fractions as judged by TLC from seven chromatographic runs were composited into eight fractions. The first composite fraction contained mostly acyclic material and the last (eighth) fraction mostly beta cyclodextrins. These were essentially discarded. The intermediate six fractions totaled 27.2 gms and contained 24.2 gms branched cyclodextrins (88.7%). Fractions 2 and 3 totaled 9.98 gms of which 8.33 gms (83.5%) was branched cyclodextrins with branches greater than 7 glucose units (with traces of G5cG7 and G6cG7). Thus 34.4% of the isolated branched beta cyclodextrins contained large branches.

EXAMPLE 2

An aqueous solution of about 17% solids containing 81.6 gms of acyclic materials, branched beta cyclodextrin, and cyclodextrins having about 68% branched beta cyclodextrins (55.5 gr.) was applied to the column of the present invention. The column bed was 7.6×69 cm and contained about 2.5 kg DOWEX 1×2, 200–400 mesh resin with an estimated 332 gm of benzoate ion attached.

The sample was eluted at ambient conditions with a flow rate of 24 ml/min. After 33 liters were collected, 94.7% of the applied solids had been recovered. The beta cyclodextrin peak appeared at 26 liters. One liter fractions were collected after the initial 5 liters. The analysis of the one liter fraction Nos. 6–22 are reported in Table I below. The molecular weight of branched beta cyclodextrin obtained in each fraction was estimated and these are shown in Table I below. Unless noted the calculation was made from HPLC analysis with the assistance of TLC chromatograms where necessary. A plot of branch glucose units per beta cyclodextrin nucleus is shown in FIG. 1.

TABLE I

| Fraction[1] | Total Grams | Grams BR-B-CD* | Weighted Average Branch Glucose Units per B-CD** Nucleus | BR-B-CD* Average Molecular Weight | Branch Glucose Unit Range[2] |
|---|---|---|---|---|---|
| 6 | 2.0 | 1.96 | 17.9[3] | 4035 | — |
| 7 | 2.6 | 2.59 | 15.0[4] | 3565 | — |
| 8 | 3.2 | 3.19 | 12.5[4] | 3160 | — |
| 9 | 3.6 | 3.59 | 10.0[4] | 2755 | 6–14[5] |
| 10 | 4.6 | 4.60 | 7.70 | 2383 | 4–11[5] |
| 11 | 5.1 | 5.07 | 5.51 | 2027 | 2–9 |
| 12 | 5.0 | 4.99 | 4.37 | 1843 | 2–7 |
| 13 | 5.0 | 4.97 | 3.45 | 1694 | 2–6 |
| 14 | 4.5 | 4.44 | 2.83 | 1594 | 1–5 |
| 15 | 3.9 | 3.87 | 2.38 | 1521 | 1–4 |
| 16 | 3.1 | 3.08 | 2.12 | 1479 | 1–4 |
| 17 | 2.4 | 2.40 | 1.92 | 1446 | 1–4 |
| 18 | 2.2 | 2.16 | 1.53 | 1383 | 1–3 |
| 19 | 2.0 | 2.00 | 1.33 | 1351 | 1–3 |
| 20–22 | 3.3 | 2.78 | 1.14 | 1320 | 1–2 |

*branched beta cyclodextrins
**beta cyclodextrins
[1] Each fraction was one liter
[2] Only branched beta cyclodextrin present in amounts greater than 4% by weight of total fraction were reported for branch length
[3] From molar ratio of glucosyl units and beta cyclodextrins generated by pullulanase (debranching enzyme)
[4] Estimated from FIG. 1 (digest branched beta cyclodextrins)
[5] Upper limit uncertain

EXAMPLE 3

Beta cyclodextrin (crystalline, 98% pure) was heated in the range 180° to 220° C. to form branched beta cyclodextrins as taught by copending application Ser. No. 232,389 filed concurrently herewith. A portion of the dextrinized beta cyclodextrin was dissolved in water to obtain a solution of about 10% solids. Toluene was added, the solution was stirred for 20 hours, and was then filtered to remove beta cyclodextrins. The resulting filtrate was treated with activated carbon at 75° C. for 20 minutes and then filtered to remove carbon. The carbon treated filtrate passed through a 1.5 cm ×40 cm bed of Amberlite MB-3 ion exchanger. A 20.7% solution containing 231.7 gms of solids was recovered. This was applied to the column described in Example 2 by pump. The flow rate was 14 ml/min, decreasing to 10 ml/min as the sample filled the column. One liter fractions were collected and branched beta cyclodextrins appeared after 5 liters and continued to 24 liters. The average molecular weight was estimated for each fraction and these are shown in Table II below expressed as average number of branch glucose units per molecule. These are plotted in FIG. 1. These analyses were done using HPLC and TLC in a standard manner.

TABLE II

| Fraction[1] | Total Grams | Grams BR-B-CD* | Weighted Average Branch Glucose Units per B-CD** Nucleus[2] | BR-B-CD* Average Molecular Weight[2] |
|---|---|---|---|---|
| 6 | 11.4 | 11.26 | 11.81 | 3047 |
| 7 | 10.1 | 10.00 | 9.77 | 2718 |
| 8 | 8.7 | 8.60 | 8.91 | 2578 |
| 9 | 8.1 | 8.02 | 7.77 | 2393 |
| 10 | 6.7 | 6.65 | 6.51 | 2190 |
| 11 | 5.4 | 5.09 | 6.38 | 2168 |
| 12 | 4.6 | 4.44 | 5.68 | 2055 |
| 13 | 3.7 | 3.54 | 5.36 | 2003 |
| 14 | 3.3 | 3.18 | 4.21 | 1817 |
| 15 | 2.9 | 2.81 | 3.33 | 1675 |
| 16 | 2.5 | 2.43 | 2.73 | 1578 |
| 17 | 2.5 | 2.42 | 2.33 | 1513 |
| 18 | 2.2 | 2.15 | 2.14 | 1482 |
| 19 | 1.9 | 1.80 | 1.93 | 1448 |
| 20 | 1.6 | 1.51 | 2.05 | 1467 |
| 21–24 | 4.4 | 3.15 | 1.78 | 1424 |

*branched beta cyclodextrins
**beta cyclodextrins
[1] Each fraction was one liter
[2] Estimates made based on assumption that the identity of chromatographic peaks was similar to digest BR-B-CD*

EXAMPLE 4

An 882.8 gms sample containing 51.2 gms (5.8%) branched beta cyclodextrins was applied to the column described in Example 2 above after subjecting it to conventional carbon treatment and ion exchange treatment.

Branched beta cyclodextrins were obtained between 7 and 25 liters elution volume. The 7–10 liter fraction contained 5.4 gms of branched beta cyclodextrins and the 10–25 liter fraction contained 31.75 gms of branched beta cyclodextrins. Overall, 37.15 gms branched beta cyclodextrins were recovered, illustrating the effectiveness of the procedure on impure low level branched beta cyclodextrin preparations. A 72.6% recovery at 84.9% purity was achieved with a very heavy column load.

It will be understood that the preferred embodiments of the present invention herein chosen for the purpose of illustration are intended to cover all changes and modifications of the preferred embodiments of the present invention which do not constitute a departure from the spirit and scope of the present invention.

What is claimed is:

1. A method for sequentially separating branched beta cyclodextrins having branches of varying molecular weight into fractions of branched beta cyclodextrins having similar molecular weight branches from a solution containing branched beta cyclodextrins with varying molecular weight branches comprising: passing said solution containing branched beta cyclodextrins with varying molecular weight branches through a matrix upon which an inclusion compound is attached by means of a bridging compound thereby positioning said inclusion compound about 6 to about 18 Å from the surface of the matrix; and eluting sequentially by fractions branched beta cyclodextrins having similar molecular weight branches wherein longer branched beta cyclodextrins are eluted before shorter branched beta cyclodextrins.

2. The method of claim 1 further comprising the step of removing unreacted starch granules and insoluble dextrins from the solution containing branched beta cyclodextrins with varying molecular weight branches prior to the step of passing the solution through the matrix.

3. The method of claim 1 further comprising the step of removing non-branched cyclodextrins from the solution containing branched beta cyclodextrins with varying molecular weight branches prior to the step of passing the solution through the matrix.

4. The method of claim 1 further comprising the step of heating said solution containing branched beta cyclodextrins prior to passing it through said matrix.

5. The method of claim 1 further comprising the step of heating said matrix and maintaining said matrix in a heated state while passing said solution of branched beta cyclodextrins through said matrix.

* * * * *